(12) United States Patent
Landrieve

(10) Patent No.: US 8,327,965 B2
(45) Date of Patent: Dec. 11, 2012

(54) INSTRUMENTED ROLLING BEARING DEVICE, PARTICULARLY FOR A MOTORCYCLE WHEEL

(75) Inventor: Franck Landrieve, Fondettes (FR)

(73) Assignee: Aktiebolaget SKF, Göteborg (SE)

( * ) Notice: Subject to any disclaimer, the term of this patent is extended or adjusted under 35 U.S.C. 154(b) by 0 days.

(21) Appl. No.: 13/129,500

(22) PCT Filed: Sep. 25, 2009

(86) PCT No.: PCT/EP2009/062468
§ 371 (c)(1),
(2), (4) Date: Jul. 1, 2011

(87) PCT Pub. No.: WO2010/054888
PCT Pub. Date: May 20, 2010

(65) Prior Publication Data
US 2011/0253469 A1    Oct. 20, 2011

(30) Foreign Application Priority Data
Nov. 17, 2008  (WO) .................. PCT/EP2008/065679

(51) Int. Cl.
*B62K 11/00* (2006.01)
(52) U.S. Cl. ....................................................... 180/219
(58) Field of Classification Search .................. 180/219; 384/448
See application file for complete search history.

(56) References Cited

U.S. PATENT DOCUMENTS

| 3,787,807 A | 1/1974 | Anselmino et al. |
| 5,129,742 A | 7/1992 | Tilch et al. |
| 6,595,693 B1 | 7/2003 | Message et al. |
| 2006/0110086 A1* | 5/2006 | Morita et al. ................. 384/448 |
| 2008/0296077 A1* | 12/2008 | Miyamoto .................... 180/219 |
| 2011/0264345 A1* | 10/2011 | Heim et al. ..................... 701/70 |

FOREIGN PATENT DOCUMENTS

| DE | 2612028 A1 | 9/1977 |
| EP | 1359423 A1 | 11/2003 |
| FR | 2871881 A1 | 12/2005 |
| WO | WO0107922 A1 | 2/2001 |

* cited by examiner

*Primary Examiner* — Tashiana Adams
(74) *Attorney, Agent, or Firm* — Mark A. Ussai; Bryan Peckjian

(57) ABSTRACT

The instrumented rolling bearing device, particularly for a two-wheeled vehicle, is provided with a rolling bearing (4) comprising an outer ring (7), an inner ring (6) and at least one row of rolling elements (8) arranged between said rings, with a sleeve (2) onto which the inner ring is mounted, and with an assembly (5) for detecting rotational parameters. The assembly comprises a sensor (14), an encoder (13) rotating past the sensor, at least one cable (16) connected to the sensor (14) for the output of signals emitted, and an output terminal (15) having an outlet (20) for the cable. The output terminal (15) is mounted axially on the side opposite the sensor (14) relative to the rolling bearing and forms an axial thrust for the inner ring (6) of said rolling bearing.

14 Claims, 5 Drawing Sheets

INSTRUMENTED ROLLING BEARING DEVICE, PARTICULARLY FOR A MOTORCYCLE WHEEL

BACKGROUND OF THE INVENTION

The present invention relates to the field of instrumented rolling bearing devices, particularly used for two-wheeled vehicles, and in particular for the front wheels of motorcycles.

The present invention relates more particularly to an instrumented rolling bearing device intended to be mounted between a shaft and a rotating wheel hub, and equipped with an assembly for detecting rotation parameters such as the angular position, the speed and the acceleration.

Document FR-A1-2 871 881 discloses a device for detecting rotation parameters of a wheel provided with a rolling bearing comprising an outer ring, an inner ring and a row of balls arranged between said rings, with a sleeve onto which the inner ring is mounted, and with a sheath surrounding the outer ring. The device also comprises an encoder mounted on the outer ring and a sensor embedded inside a wire terminal which is mounted on the sheath.

The disclosed device has the drawback of using an elastic driving member between the outer ring of the rolling bearing and the wheel hub to rotate said outer ring by friction contact.

In fact, this rolling bearing is not used for supporting the wheel hub, but only for detecting rotation parameters of the wheel. To this end, the rolling bearing is axially disposed between the wheel hub and a fork arm of the wheel.

Otherwise, particularly during rainy weather, splash pollutants are likely to enter the device, and pollution of the device by external elements may adversely affect the operation of the detection elements.

To protect against polluting elements the encoder and the sensor, it is thus necessary to foresee a seal between the outer ring of the rolling bearing and the sheath surrounding said ring. This is detrimental in terms of mounting time and of cost.

In another field, such instrumented rolling bearings are also known, particularly from WO 01/07922. The disclosed rolling bearing comprises a sleeve secured to the inner ring, a sensor unit fixed to the outer ring and supporting a sensor, an encoder member mounted on the inner ring, and a terminal for leading out wires for communicating the electric signals emitted by the sensor.

This instrumented rolling bearing is not useful for motorcycle wheels operating in an aggressive outdoor environment due to the presence of various kinds of pollution, such as splashing water, dust and other foreign matter, and where it is necessary to be able to reliably measure the rotation parameters.

FR-A1-2 839 349 discloses an instrumented rolling bearing useful as bearing for pulleys which are submitted to difficult environmental conditions, and comprising a seal mounted on the sensor support and pressing against the outer surface of the outer ring.

This instrumented rolling bearing is not satisfactory in terms of cost and of mounting time because an additional seal is used. Besides, the seal creates a friction between the parts of the rolling bearing.

SUMMARY OF THE INVENTION

One aim of the present invention is to overcome the aforementioned drawbacks.

The invention also seeks to provide an instrumented rolling bearing device adapted to a two-wheeled vehicle that prevents the intrusion of water, dust and other bodies on the detection means, may easily be mounted and is cheap to manufacture.

It is a particular object of the present invention to provide an instrumented rolling bearing device useful as bearing for a wheel hub that is particularly easy to connect to an external system, and prevents foreign bodies from coming into contact with the detection means while limiting rotational friction.

In one embodiment, an instrumented rolling bearing device, particularly for a two-wheeled vehicle, is provided with a rolling bearing comprising an outer ring, an inner ring and at least one row of rolling elements arranged between said rings, with a sleeve onto which the inner ring is mounted, and with an assembly for detecting rotational parameters. Said assembly comprises a sensor, an encoder rotating past the sensor, at least one cable connected to the sensor for the output of signals emitted, and an output terminal having an outlet for the cable. The output terminal is mounted axially on the side opposite the sensor relative to the rolling bearing and forms or constitutes an axial thrust for the inner ring of the rolling bearing.

Preferably, the cable extends along the sleeve. A groove can be provided on the sleeve for mounting the cable.

Advantageously, the assembly for detecting rotational parameter comprises a sensor body mounted on the sleeve, the sensor being at least partly embedded inside said sensor body.

In one embodiment, the sensor body is overmoulded onto the sleeve and onto the cable. The sensor body may constitute an axial thrust for the inner ring of the rolling bearing. The sensor body may comprise a flange surrounding the encoder and designed or adapted to form a flow deflector for reducing any ingress of foreign bodies between said encoder and the sensor.

Preferably, the output terminal is mounted on the sleeve.

In one embodiment, the output terminal is overmoulded onto the sleeve and onto an end portion of the cable.

In one embodiment, the sleeve is made in one part. Alternatively, the sleeve can be made in at least two parts. The inner ring is mounted onto the first part and the second part comes into contact with a radial surface of said inner ring. Advantageously, the second part of the sleeve comprises a recess into which is received the output terminal.

The invention further relates to a two-wheeled vehicle comprising at least one fork for one of the wheels, a shaft linked to the fork arms, a wheel hub mounted rotatably relative to said shaft, and an instrumented rolling bearing device mounted on the shaft. Said device is provided with a rolling bearing comprising an outer ring, an inner ring and at least one row of rolling elements arranged between said rings, with a sleeve disposed on the shaft and onto which the inner ring is mounted, and with an assembly for detecting rotational parameters comprising a sensor, an encoder rotating past the sensor, at least one cable connected to the sensor for the output of the signals emitted, and an output terminal having an outlet for the cable. The rolling bearing of the device supports the wheel hub. The sensor is disposed on the internal side of the wheel hub. The output terminal is mounted axially on the side opposite the sensor relative to the rolling bearing, i.e. on the external side of the wheel hub.

The arrangement of the sensor and the encoder on the internal side of the wheel hub makes possible to prevent the intrusion of foreign bodies on these elements without using specific or additional seal. In fact, the rolling bearing, and more particularly the seal(s) provided between the rings of bearing, constitutes a protection means for the sensor and the encoder.

The assembly for detecting rotational parameters, usually subject to intense pollution by various splashes, particularly earth and mud, therefore has a limited risk of damage, thus increasing the reliability and service life of the instrumented rolling bearing device.

Otherwise, since the output terminal is mounted axially on the external side of the wheel hub, it is easy to connect the cable for supplying electrical power and communicating the electrics signals emitted by the sensor.

The invention also relates to a manufacturing method of an instrumented rolling bearing device, particularly for a two-wheeled vehicle, comprising a rolling bearing, a sleeve onto which the rolling bearing is mounted, an assembly for detecting rotational parameters comprising a sensor body, a sensor, an encoder rotating past the sensor, at least one cable connected to the sensor for the output of signals emitted, and an output terminal having an outlet for the cable. The sensor body is overmoulded onto the sleeve and onto the cable, a free end portion of said cable located axially on the side opposite the sensor relative to the rolling bearing extending out of the sensor body. The rolling bearing equipped with the encoder is mounted on the sleeve and axially pushed until the inner ring bears against the sensor body. The output terminal is then overmoulded onto the free end portion of the cable, onto the sleeve and onto the inner ring of the rolling bearing.

BRIEF DESCRIPTION OF THE SEVERAL VIEWS OF THE DRAWINGS

The present invention and its advantages will be better understood by studying the detailed description of one embodiment taken as non-limiting example and illustrated by the appended drawings wherein.

DETAILED DESCRIPTION OF THE INVENTION

Figure 1:
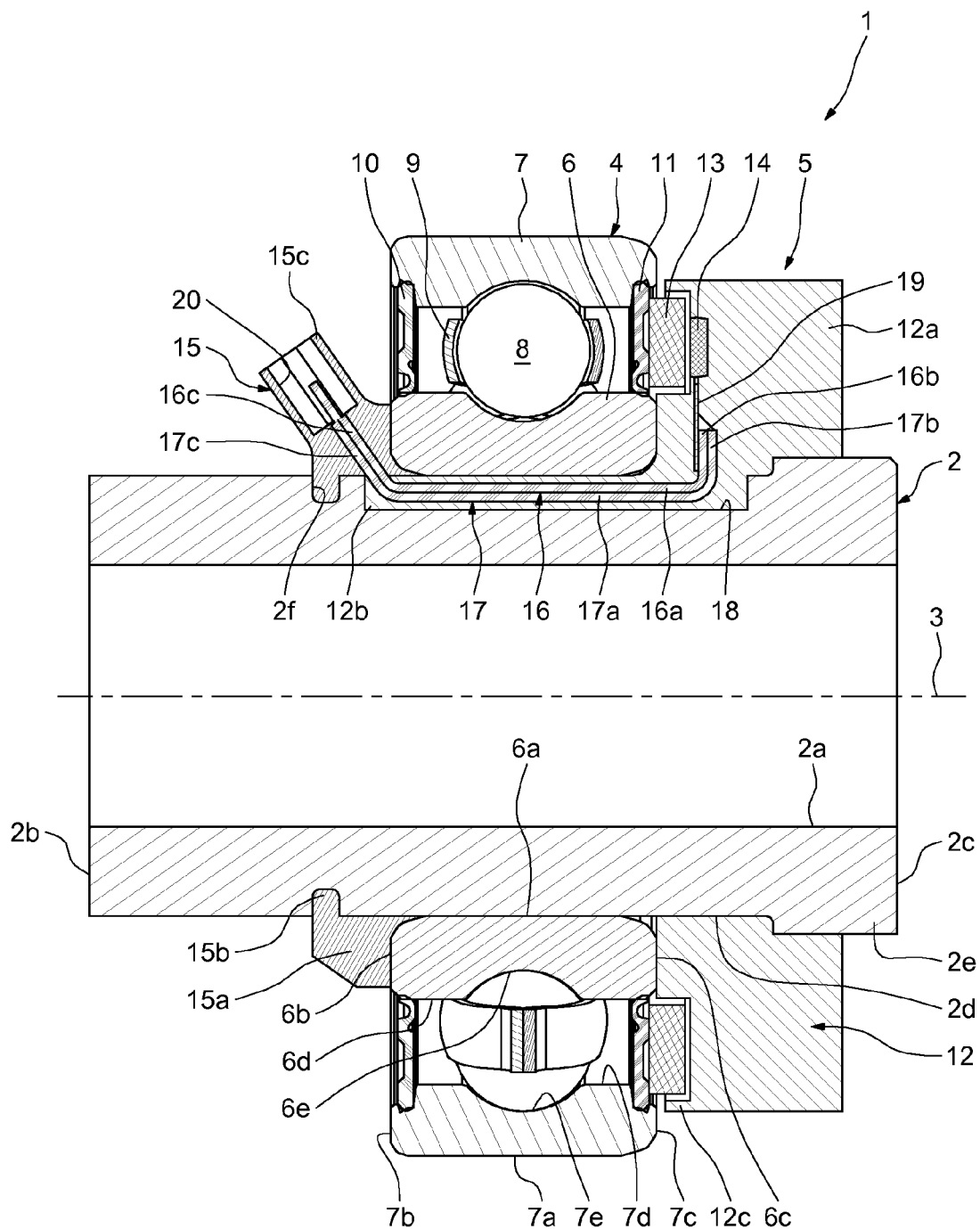
FIG. 1 is a view in axial section of an instrumented rolling bearing device in accordance with a first embodiment of the invention.

FIG. 1 shows the general structure of an instrumented rolling bearing device 1 comprising a sleeve 2 with a geometric axis 3, a rolling bearing 4 mounted on said sleeve, and an assembly 5 for detecting rotation parameters of the rolling bearing.

Such a device is particularly useful for detecting rotation parameters of a wheel of a two-wheeled vehicle such as a motorbike. However, the device can be applied equally well to other applications such as bicycle, tricycle or quads.

The rolling bearing 4 comprises an inner ring 6, an outer ring 7, between which is housed a row of rolling elements 8, which in this case are balls, a cage 9 for retaining the circumferential space of the rolling elements 8 and two seals 10 and 11.

The inner and outer rings 6, 7 are concentric and symmetric with respect to a transverse radial plane passing through the centre of the rolling bearing. The inner ring 6 is of the solid type. A "solid ring" is to be understood as a ring obtained by machining with removal of material (by machining, grinding) from tube stock, bar stock, rough forgings and/or rolled blanks.

The inner ring 6 comprises a bore 6a of cylindrical shape delimited by opposing radial lateral surfaces 6b and 6c, and an outer cylindrical surface 6d onto which is formed a toroidal circular raceway 6e having in cross section a concave internal profile adapted to the rolling elements 8, the said raceway being directed radially outwards.

The outer ring 7, also of solid type, comprises an outer cylindrical surface 7a delimited by opposing radial lateral surfaces 7b and 7c, and a bore 7d of cylindrical shape from which is formed a toroidal circular raceway 7e having in cross section a concave internal profile adapted to the rolling elements 8, the said raceway being directed radially inwards.

The outer ring 7 also comprises, at the bore 7d and close to the radial surfaces 7b and 7c, two annular grooves symmetrical with one another relative to the radial plane passing through the centre of the rolling elements 8. Inside the said grooves are fixedly mounted the seals 10 and 11 coming into contact with the outer cylindrical surface 6d of the inner ring 6 for preventing the ingress of undesirable external elements into the rolling bearing 4. The seals 10, 11 are placed radially between the inner and outer rings 6, 7. The seal 10 is mounted axially between the rolling elements 8 and the radial surfaces 6b and 7b of the rings 6 and 7, the seal 11 being mounted axially between the rolling elements 8 and the radial surfaces 6c and 7c.

The annular sleeve 2 is made in one part and provided with a bore 2a, delimited by opposing radial side surfaces 2b and 2c, and with a cylindrical outer surface 2d onto which is fitted the inner ring 6 of the rolling bearing 4. The sleeve 2 also comprises, at an axial end, a radial flange 2e to increase the size of the radial surface 2c.

The rotation parameter detection assembly 5 comprises a sensor body 12, made out of moulded synthetic material, and mounted on the outer surface 2d and on the flange 2e of the sleeve 2, an encoder or coder 13 fixedly attached to the seal 11, and a sensor 14 mounted on the body 12.

The coder 13 projects axially with respect to the radial surfaces 6c, 7c of the inner and outer rings 6, 7. The coder 13 comprises an active part which may for example be made of plastoferrite or of nitrile-ferrite, which is a mixture with a nitrile base and magnetized ferrite particles. The active part, of annular shape, comprises an inner surface mounted on the external side of seal 11 and an outer surface provided with a regular alternation of magnetic poles of opposing polarities "north" and "south" (not shown), thus forming a periodic pattern consisting of a "north" pole and a "south" pole repeated a whole number of times onto the circumference of the active part. The coder 13 is fixedly mounted on the outer ring 7 via the seal 11 by any appropriate means, for example by adhesive bonding. Alternatively, it is easily understood that the coder 13 could also be directly mounted on the outer ring 7 for example with a coder body fitted onto the outer surface 7a of the outer ring 7.

The sensor 14 also comprises an active part mounted semi-embedded inside the sensor body 12 and flush with an annular surface in order to be mounted opposite the coder 13 with a slight axial air gap left between the sensor body 12 and the coder 13. The sensor 14 is of the magnetism-sensitive type, for example a magnetoresistor or a Hall effect probe. The sensor 14 is located near the outer ring 9 of the rolling bearing 4 which keeps the device 1 suitably compact.

The assembly 5 for detecting rotation parameters also comprises a connector or output terminal 15 and two cables 16, 17 connected to the sensor 14 for the output of signals emitted by said sensor and for its electrical power supply. The output terminal 15, for example made of synthetic material, is mounted axially on the side opposite the sensor 14 and the coder 13 relative to the rolling bearing 4. Here, two cables are provided for supplying electrical power and communicating the electric signals. It is easily understood that it could also be possible to use a single cable, or three or more cables.

To connect the sensor 14 to the terminal output 15 and to enable the routing or passage of the cables 16 and 17, an axial groove 18 is provided on the portion of the outer surface 2d of the sleeve 2 onto which is intended to be fitted the inner ring 6 of the rolling bearing 4. The groove 18 extends axially either side of the inner ring 6.

Axial portions 16a, 17a of the cables 16, 17 are housed inside the groove 18 and are extended radially outwards towards the sensor 14 by radial portions 16b, 17b. The radial portions 16b, 17b are connected to the sensor 14 via wires 19 extending radially between these elements. Axially on the side opposite the radial portions 16b and 17b, the axial portions 16a, 16b are respectively extended by tilted free end portions 16c, 17c which are located out of the groove 18 near the radial surface 6b of the inner ring 6.

The wires 19, the axial portions 16a, 17a and the radial portions 16b, 17b of the cables are entirely embedded inside the sensor body 12 which is overmoulded onto the sleeve 12. More particularly, the sensor body 12 is overmoulded onto the groove 18, onto the outer surface 2d and onto the flange 2e of the sleeve 2. After the overmoulding of the sensor body 12, only the end portions 16c, 17c of the cables 16, 17 are not embedded and extend out of said sensor body and of the sleeve 2.

The sensor body 12 is provided with a radial portion 12a fixed on the outer surface 2d and on the flange 2e of the sleeve into which are embedded the sensor 14, the wires 19 and the radial portions 16b, 17b of the cables 16, 17. The radial portion 12a comes into contact with the radial surface 6c of the inner ring 6. The radial portion 12a constitutes an axial thrust for the mounting of rolling bearing 4. The sensor body 12 is also provided with an axial extension 12b extending along the groove 18 and into which are embedded the axial portions 16a, 17a of the cables. The sensor body 12 also comprises an axial flange 12c surrounding the coder 13 and extending close to the radial surface 7c of the outer ring 7 to constitute a flow deflector for reducing any ingress of foreign bodies between said coder 13 and the sensor 14.

The output terminal 15 comprises an annular body 15a fixed on the outer surface 2d of the sleeve 2. The body 15a comes into contact with the radial surface 6b of the inner ring 6 and constitutes an axial thrust for the rolling bearing 4. The body 15a also comprises an annular heel 15b extending radially into an annular groove 2f provided on the outer surface 2d of the sleeve 2, axially between the radial surface 2b and the groove 18. The heel 15b cooperates with the groove 2f for mounting and retaining the output terminal 15 on the sleeve.

The output terminal 15 also comprises an extension 15c having a generally parallelepipedic form and extending outwardly from the body 15a. The extension 15c is provided with a cable outlet 20 for the cables 16, 17 for supplying the electric power supply and communicating the electric signals emitted by the sensor 14 to other elements, for example an external electronic processing unit, in order to determine the rotation parameters, in particular the speed of the vehicle using the device 1. The cables 16, 17 protrude into the cable outlet 20.

The output terminal 15 is advantageously overmoulded onto the sleeve 2, onto a part of the axial extension 12b of the sensor body 12, and onto the radial surface 6b of the inner ring 6. The output terminal 15 constitutes an axial thrust for the rolling bearing 4.

The manufacture of the instrumented rolling bearing device 1 may comprise the following steps. First of all, the sensor body 12 is overmoulded onto the sleeve 2. After this step, the portions 16a, 16b and 17a, 17b, of the cables 16 and 17, the wires 19 and the sensor 14 are embedded into the sensor body 12a. The sensor body 12 is advantageously overmoulded in one single step onto the sleeve 2, the portions 16a, 16b and 17a, 17b, of the cables 16 and 17, the wires 19 and the sensor 14.

After, the rolling bearing 4 provided with the coder 13 is mounted on the outer surface 2d of the sleeve 2 and then axially pushed until the inner ring 6 bears against the radial portion 12a of the sensor body 12. Finally, the output terminal 15 is overmoulded onto the portions 16c and 17c of the cables 16 and 17, onto the sleeve 2 and onto the radial surface 6b of the inner ring 6. Each of the portions 16c, 17c protrudes into the cable outlet 20 in order to connect the device to an external system. Preferably, the sensor body 12 is made of thermoplastic material and the sleeve 2 is made of metal.

Figure 2:
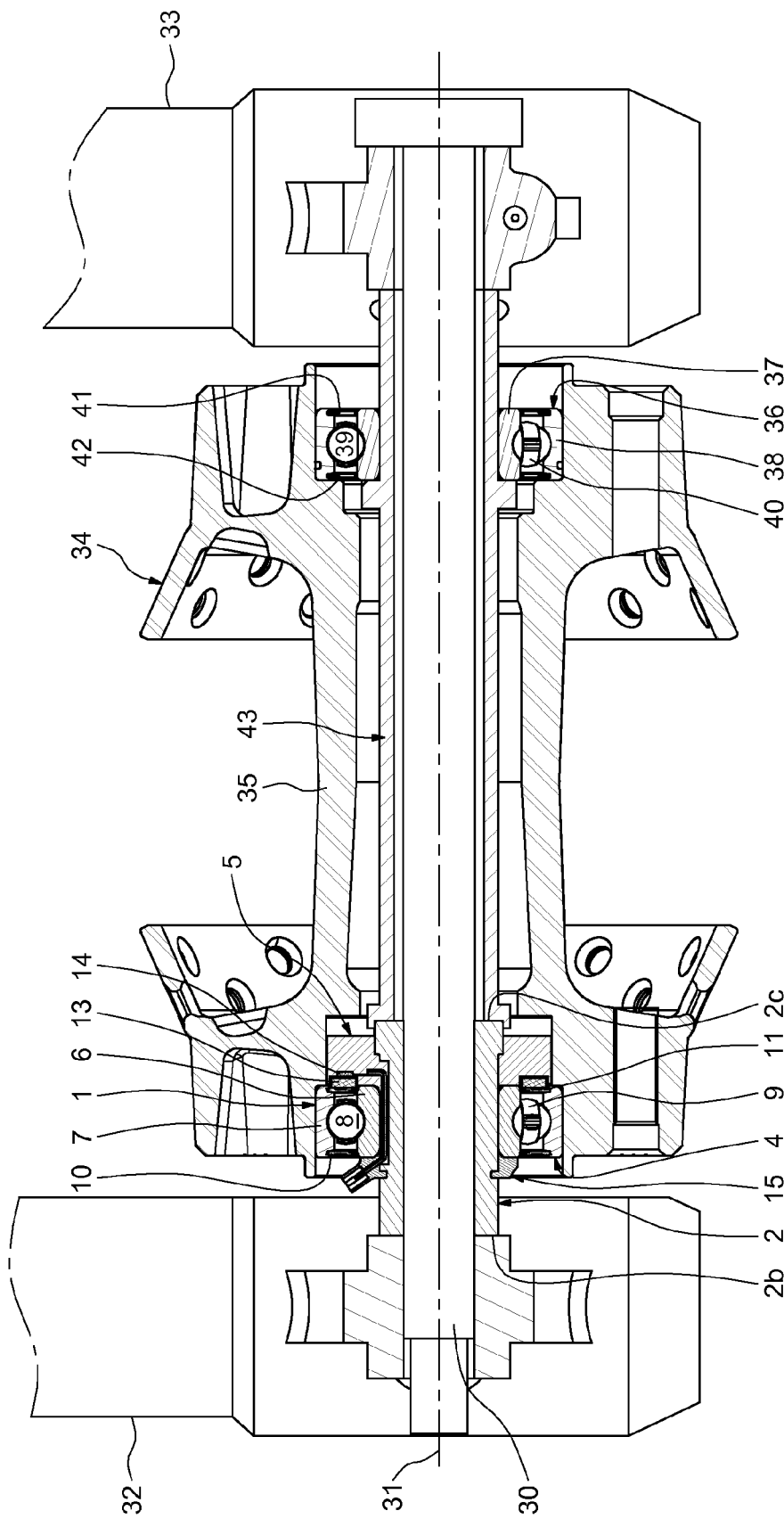
FIG. 2 is a schematic view in axial section of the device of FIG. 1 mounted on a wheel shaft.
Figure 3:
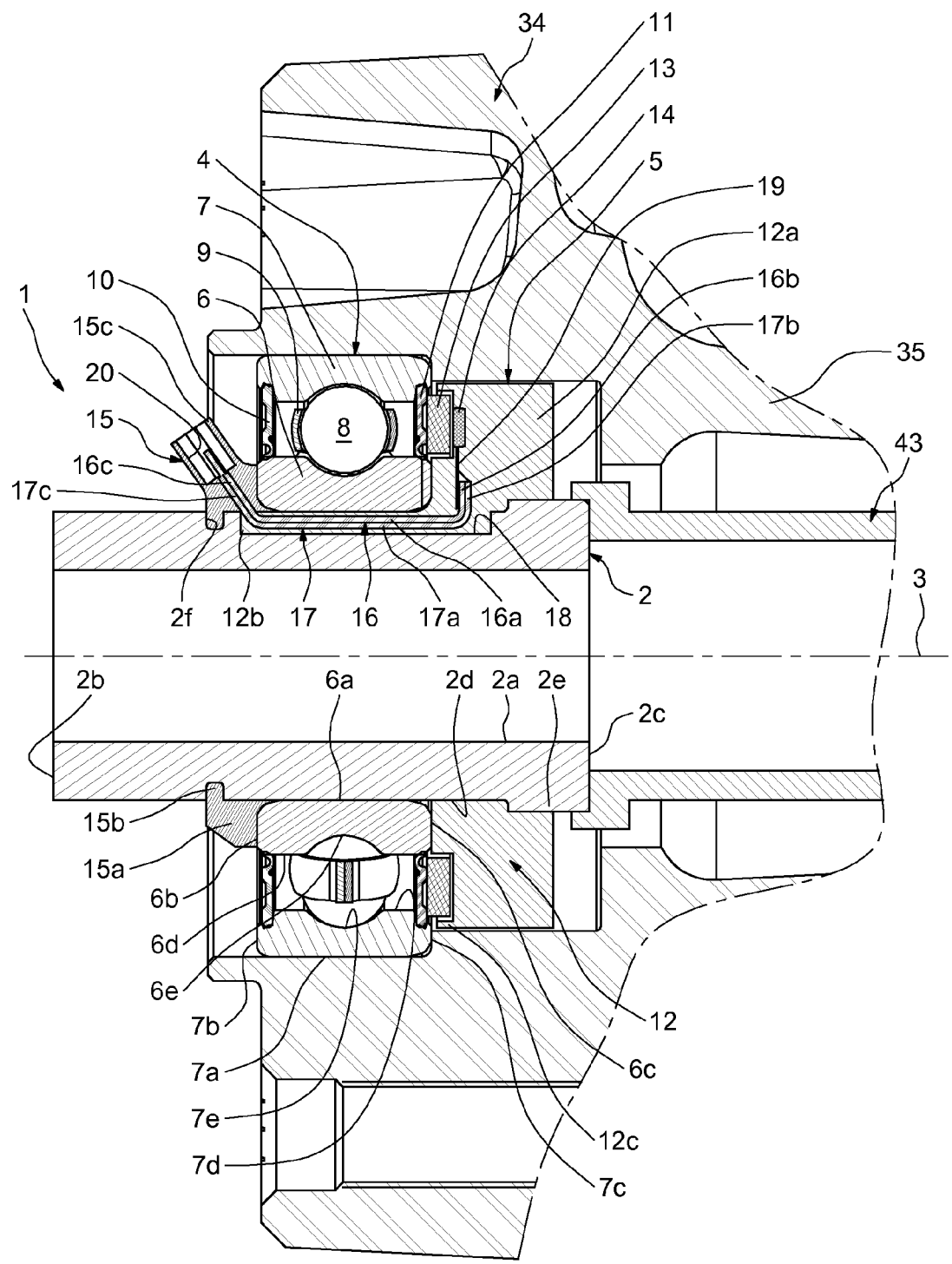
FIG. 3 is a part section on a larger scale of the wheel shaft of FIG. 2.
Figure 4:
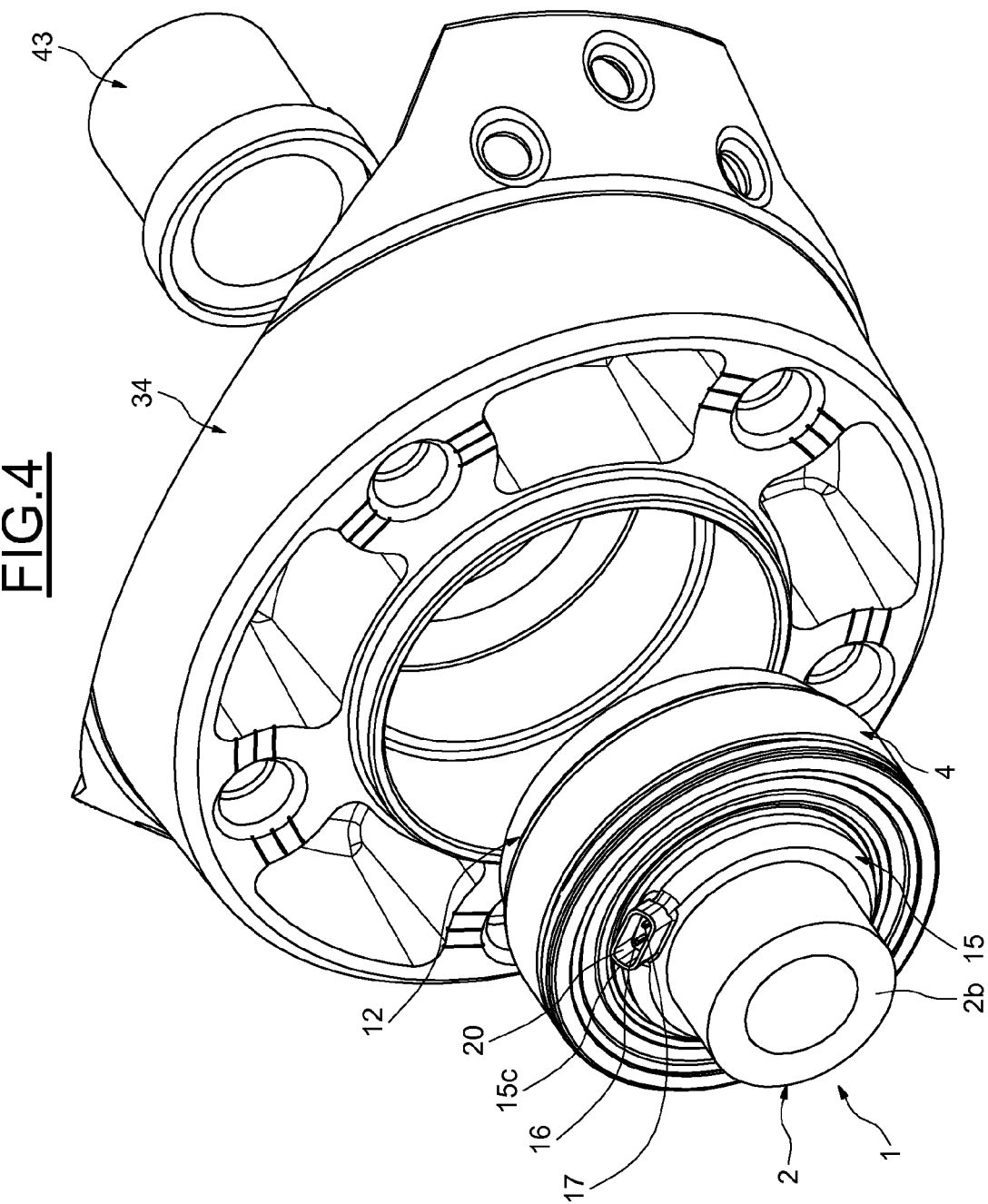
FIG. 4 is an exploded view of FIG. 3.

As shown on FIGS. 2 to 4, the instrumented rolling bearing device 1 is mounted on a shaft 30 with a geometric axis 31 between two arms 32, 33 of a fork. The shaft 30 also comprises a wheel hub 34 having a generally C-shape in cross section and provided with an annular body 35 mounted rotatably on the said shaft 30 by means of the rolling bearing 4 and of a rolling bearing 36 mounted at each axial end of the said body 35. The rolling bearing 36 comprises a non-rotatable inner ring 37, a rotatable outer ring 38 between which is housed a row of rolling elements 39, which in this case are balls, a retainer cage 40 for keeping the rolling elements 39 circumferentially equally spaced apart, and two seals 41, 42 placed axially on either side of the rolling elements 39 and coming into contact with the inner ring 37.

A spacer 43 surrounding the shaft 30 provides the spacing and the transmission of the axial forces between the inner ring 37 of the bearing 36 and the sleeve 2. To this end, the spacer 43 is mounted in contact with the radial surface 2c of the sleeve 2 and with the inner ring 37. The spacer 43 comes also into contact with the arm 33. The radial surface 2b of the sleeve 2 is mounted bearing on the arm 32. The sleeve 2 thus allows the device 1 to be mounted on the shaft 30, but also the transmission of axial forces between the wheel hub 34, the shaft 30 and the fork arms 32 and 33.

The arrangement of the sensor 14 and the coder 13 on the internal side of the wheel hub 34, i.e. axially between the rolling bearing 4 and the body 35 of said wheel hub 34, makes possible to prevent the intrusion of foreign bodies on these elements without using specific or additional seal. In fact, the rolling bearing 4, and more particularly the seal 10 fixed to the rotatable outer ring 7 and disposed on the external side of the wheel hub, constitutes a protection means for the sensor 14 and the coder 13.

Besides, since the output terminal 15 is mounted axially on the external side of the wheel hub 34, it is easy to connect the cables 16, 17 to an external system for supplying the electrical power and transmitting the electrics signals emitted by the sensor 14.

Figure 5:
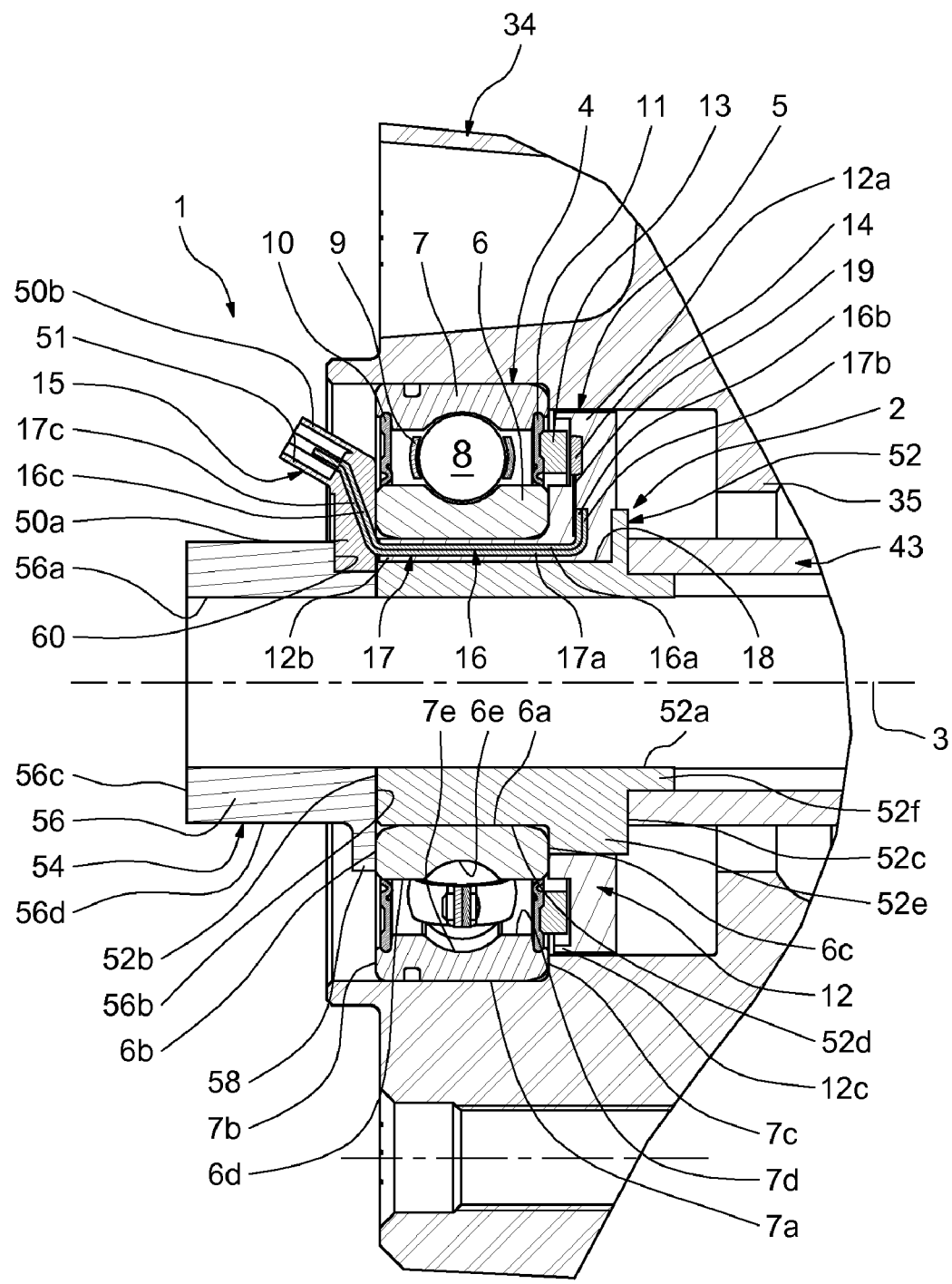
FIG. 5 is a view in axial section of an instrumented rolling bearing device in accordance with a second embodiment of the invention.

On the embodiment illustrated in FIG. 5, in which identical parts are given identical references, the output terminal 15 comprises a parallelepipedic body 50a which comes into contact with the radial surface 6b of the inner ring 6. The output terminal 15 also comprises an extension 50b having a generally parallelepipedic form and extending outwardly from the body 50a. The extension 50b is provided with a cable outlet 51 for the cables 16, 17. The cables 16, 17 protrude into the cable outlet 51.

The output terminal 15 is advantageously overmoulded onto a radial end surface of the axial extension 12b of the sensor body 12, and onto the radial surface 6b of the inner ring 6. The output terminal 15 constitutes an axial thrust for the rolling bearing 4.

In this embodiment, the device 1 comprises a sleeve 2 made in two parts 52, 54. The first part 52 is provided with a bore 52a, delimited by opposing radial side surfaces 52b and 52c, and with a cylindrical outer surface 52d onto which is fitted the inner ring 6 of the rolling bearing 4. The radial surface 52b is situated in a radial plane containing the radial surface 6b, 7d on the rings 6, 7. The first part 52 also comprises, at an axial end, a radial flange 52e to increase the size of the radial surface 52c. The radial flange 52e is extended on the opposite side of the outer surface 52d by an axial portion 52f for the centering of the spacer 42 (FIG. 2).

To connect the sensor 14 to the terminal output 15 and to enable the routing or passage of the cables 16 and 17, the axial groove 18 is also provided on the portion of the outer surface 52d of the first part 52 of the sleeve 2 onto which is fitted the inner ring 6 of the rolling bearing 4.

To allow the transmission of axial forces between the fork arms 32 and 33 (FIG. 2), the second part 56 of the sleeve 2 is adapted to be mounted around the shaft and to form a spacer between the inner ring 6 of the rolling bearing 4 and the arm 32.

The second part 54 comprises an annular axial portion 56 provided with a bore 56a, delimited by opposing radial side surfaces 56b and 56c, and with a cylindrical outer surface 56d. The radial surface 56b is mounted in contact with the radial surface 52b of the first part 52, the radial surface 56c being adapted to mounted bearing on the arm 32. The second part 54 also comprises, at an axial end, an annular radial flange 58 to increase the size of the radial surface 56b. The flange 58 is in contact with the radial surface 6b of the ring 6.

The second part 54 comprises a cavity or recess 60 provided on the flange 58 and which extends radially inwards into the axial portion 56. The recess 60 is adapted to receive the body 50a of the output terminal 15. The body 50a projects axially with respect to the flange 58.

The manufacture of the instrumented device 1 may comprise the following steps. First of all, the sensor body 12 is overmoulded onto the first part 52 of the sleeve 2. After this step, the portions 16a, 16b and 17a, 17b, of the cables 16 and 17, the wires 19 and the sensor 14 are embedded into the sensor body 12a. The sensor body 12 is advantageously overmoulded in one single step onto the first part 52 of the sleeve 2, the portions 16a, 16b and 17a, 17b, of the cables 16 and 17, the wires 19 and the sensor 14.

After, the rolling bearing 4 provided with the coder 13 is mounted on the outer surface 52d of the first part 52 of the sleeve 2 and then axially pushed until the inner ring 6 bears against the radial portion 12a of the sensor body 12. Then, the output terminal 15 is overmoulded onto the portions 16c and 17c of the cables 16 and 17, onto the radial end surface of the axial extension 12b of the sensor body 12, onto the radial surface 6b of the inner ring 6, and onto the radial surface 52b of the first part 52 of the sleeve 2. In this embodiment, the body 15a of the output terminal 15 has a limited dimension in the circumferential direction. For example, the circumferential direction is comprised between 30 and 60°. Thus, after its overmoulding on the inner ring 6, the output terminal 15 leaves a portion of the radial surface 52b uncovered.

Finally, the second part 54 of the sleeve 2 is overmoulded onto the uncovered portion of the radial surface 52b of the first part 52 and onto the body 15a of the output terminal 15. By this way, the output terminal 15 is less sollicitated by the axial forces between the fork arms.

In another embodiment, it is also possible to not overmould the second part 54 of the sleeve 2. In this case, the free portion of the radial surface 52b of the first part 52 of the sleeve 2 can be used as a reference surface for the mounting of the second part 54 against the inner ring 6. In this case, in order to obtain the axial retaining of the second part 54 relative to the first part 52, said second part 54 can comprise axial lugs extending from the radial surface 52b and provided at their free end with a bulge or rib adapted to cooperate with corresponding grooves provided on the first part 54. Advantageously, the circumferential dimension of the recess 60 is slightly larger than the circumferential dimension of the output terminal 15 in order that said output terminal 15 is disposed inside the recess in a non-contact state. Thus, the output terminal 15 is not sollicitated by the axial forces between the fork arms.

The invention claimed is:

1. An instrumented rolling bearing device for a two-wheeled vehicle, the device comprising:
a rolling bearing with opposing axial sides and including an outer ring, an inner ring, at least one row of rolling elements arranged between the outer and inner rings, and a sleeve onto which the inner ring is mounted, and
a rotational parameter detection assembly including a sensor mounted on one of the axial sides of the rolling bearing, an encoder configured to rotate past the sensor, at least one cable connected to the sensor for the output of signals emitted from the sensor, and an output terminal having an outlet for the cable, being mounted on the other one of the axial sides of the rolling bearing, and providing axial thrust support for the inner ring of the rolling bearing.

2. The device according to claim 1, wherein the cable extends along the sleeve.

3. The device according to claim 1, wherein the sleeve is provided with a groove for mounting the cable.

4. The device according to claim 1, wherein the rotational parameter detection assembly further includes a sensor body mounted on the sleeve, the sensor being at least partly embedded within the sensor body.

5. The device according to claim 4, wherein the sensor body is overmoulded onto the sleeve and onto the cable.

6. The device according to claim 4, wherein the sensor body is configured to provide axial thrust support for the inner ring of the rolling bearing.

7. The device according to claim 4, wherein the sensor body includes a flange surrounding the encoder and adapted to constitute a flow deflector for at least reducing ingress of foreign bodies between the encoder and the sensor.

8. The device according to claim 1, wherein the output terminal is mounted on the sleeve.

9. The device according to claim 1, wherein the output terminal is overmoulded onto the sleeve and onto an end portion of the cable.

10. The device according to claim 1, wherein the sleeve is of one-piece construction.

11. The device according to claim 1, wherein the sleeve is formed of at least first and second parts, the inner ring being mounted onto the first part and the second part contacting a radial surface of the inner ring.

12. The device according to claim 11, wherein the second part has a recess into which is received the output terminal.

13. A two-wheeled vehicle comprising:

at least one fork for one of the two wheels and having two arms, a shaft linked to the fork arms, a wheel hub, and an instrumented rolling bearing device configured to rotatable mount the hub to the shaft and including a rolling bearing with opposing axial sides and having an outer ring, an inner ring, at least one row of rolling elements arranged between the outer and inner rings, and a sleeve onto which the inner ring is mounted, and a rotational parameter detection assembly including a sensor mounted on one of the axial sides of the rolling bearing, an encoder configured to rotate past the sensor, at least one cable connected to the sensor for the output of signals emitted from the sensor, and an output terminal having an outlet for the cable, being mounted on the other one of the axial sides of the rolling bearing, and providing axial thrust support for the inner ring of the rolling bearing, and wherein the sleeve is disposed on the shaft, the rolling bearing supports the wheel hub, and the sensor is disposed on an internal side of the wheel hub.

14. A method of manufacturing of an instrumented rolling bearing device for a two-wheeled vehicle, the method comprising the steps of:

providing a rolling bearing, a sleeve, a rotational parameter detection assembly including a sensor body, a sensor, an encoder, at least one cable, and an output terminal overmoulding the sensor body onto the sleeve and onto the cable such that a free end portion of the cable is located axially on a side of the rolling bearing opposite the sensor mounting the rolling bearing equipped with the encoder on the sleeve, axially pushing the bearing and encoder on the shaft until the inner ring bears against the sensor body, and overmoulding the output terminal onto the free end portion of the cable, onto the sleeve and onto the inner ring of the rolling bearing.

* * * * *